United States Patent
Lee et al.

(10) Patent No.: US 7,541,891 B2
(45) Date of Patent: Jun. 2, 2009

(54) DUAL BAND DIGITAL MULTIMEDIA BROADCASTING RECEIVER

(75) Inventors: Ki-Jeong Lee, Suwon-si (KR); Hwang Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 135 days.

(21) Appl. No.: 11/717,533

(22) Filed: Mar. 13, 2007

(65) Prior Publication Data

US 2008/0042777 A1 Feb. 21, 2008

(30) Foreign Application Priority Data

Aug. 16, 2006 (KR) ............ 10-2006-0077046

(51) Int. Cl.
*H01P 5/12* (2006.01)
(52) U.S. Cl. .................. 333/126; 333/103
(58) Field of Classification Search ........ 455/78, 455/101, 550.1; 333/101, 103, 105, 126
See application file for complete search history.

(56) References Cited

U.S. PATENT DOCUMENTS

| | | | |
|---|---|---|---|
| 5,815,804 A * | 9/1998 | Newell et al. ........ 455/78 |
| 6,014,551 A | 1/2000 | Pesola et al. | |
| 6,125,271 A | 9/2000 | Rowland, Jr. | |
| 7,366,480 B2 * | 4/2008 | Amano ............ 455/101 |
| 7,383,032 B2 * | 6/2008 | Frank et al. ........ 455/183.2 |
| 2004/0180633 A1 * | 9/2004 | Nakatani et al. ....... 455/103 |

FOREIGN PATENT DOCUMENTS

| KR | 1020020054523 | 7/2002 |
|---|---|---|
| KR | 1020060016374 | 2/2006 |
| KR | 100588227 | 6/2006 |

\* cited by examiner

*Primary Examiner*—Don P Le
(74) *Attorney, Agent, or Firm*—The Farrell Law Firm, PC

(57) ABSTRACT

A dual band digital multimedia broadcasting (DMB) receiver is provided. The dual band DMB receiver of the present invention includes a first and a second antenna for receiving first and second frequency band signals, respectively; a body for recovering the signals received by the first and second antennas; and a switch unit for selectively connecting the first and second antennas to the body. The dual band DMB receiver of the present invention is implemented with a single RF switch for measuring at least two frequency band signals, whereby it is possible to reduce the manufacturing costs of the DMB receiver and secure space for other components.

7 Claims, 3 Drawing Sheets

DUAL BAND DIGITAL MULTIMEDIA BROADCASTING RECEIVER

PRIORITY

This application claims priority to an application entitled "DUAL BAND DIGITAL MULTIMEDIA BROADCASTING RECEIVER" filed in the Korean Intellectual Property Office on Aug. 16, 2006 and assigned Serial No. 2006-77046, the contents of which are incorporated herein by reference.

BACKGROUND OF THE INVENTION

1. Field of the Invention

The present invention relates to Digital Multimedia Broadcasting (DMB) and, in particular, to a dual band DMB receiver.

2. Description of the Related Art

As the Digital Multimedia Broadcasting-Terrestrial/Handheld (DMB-T/H) standard, which is allocated a Very High Frequency (VHF) band III (174 Mhz to 239 MHz) and an L band (1,450 MHz to 1,495 MHz), has been selected for Chinese digital TV, it is required to develop a dual band DMB receiver supporting both bands.

FIG. 1 is a block diagram illustrating a configuration of a conventional dual band DMB receiver for receiving Radio Frequency (RF) signals on band III and L band.

In FIG. 1, the dual band DMB receiver includes a band III antenna 120 for receiving RF signals on the VHF band III and an L band antenna 140 for receiving RF signals on the L band. The dual band DMB receiver is provided with a first RF switch 125 and a first band pass filter 127 connected in series between band III antenna 120 and a body 110 of the dual band DMB receiver, and a second RF switch 145 and a second band pass filter 147 connected in series between L band antenna 140 and body 110.

However, the conventional dual band DMB receiver is disadvantageous in that two switches installed on respective signal lines for the band III antenna and L band antenna are required for measuring signal propagation characteristics, resulting in an increase in manufacturing costs.

Also, the relatively large spaces required for the two switches for the band III antenna and the L band antenna of the dual band DMB receiver limit the design of a compact and slim DMB receiver.

SUMMARY OF THE INVENTION

The present invention has been made in an effort to solve the above problems, and it is an object of the present invention to provide a dual band DMB receiver that can be designed in a compact contour and can reduce the manufacturing costs by minimizing: the number of RF switches used for measuring RF signal propagation characteristics.

In accordance with an aspect of the present invention, the above and other objects can be accomplished by a broadcast receiver. The broadcast receiver of the present invention includes a first and a second antenna for receiving first and second frequency band signals, respectively; a body for recovering the signals received by the first and second antennae; and a switch unit for selectively connecting the first and second antennae to the body.

Preferably, the switch unit includes a first diplexer having two first input terminals connected to the respective first and second antennae and a first output terminal; a second diplexer having a second input terminal connected to the first output terminal of the first diplexer and two second output terminals connected to the body; and a radio frequency switch interconnecting the first output terminal of the first diplexer and the second input terminal of the second diplexer.

Preferably, the switch unit further includes a first band pass filter installed on a line connecting one of the second output terminals of the second diplexer and the body for passing the first frequency band signal.

Preferably, the switch unit further includes a second band pass filter installed on another line connecting the other of the second output terminals of the second diplexer and the body for passing the second frequency band signal.

Preferably, the first diplexer includes a low pass filter for passing the first frequency band signal and a high pass filter for passing the second frequency band signal.

Preferably, the second diplexer includes a low pass filter for passing the first frequency band signal and a high pass filter for passing the second frequency band signal.

Preferably, the first frequency band signal is a very high frequency (VHF) band III signal.

Preferably, the second frequency band signal is an ultra high frequency (UHF) L band signal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and described herein in detail, with the understanding that the present disclosure is to be considered as an exemplification of the principles of the invention and is not intended to limit the invention to the specific embodiments illustrated.

Figure 1:
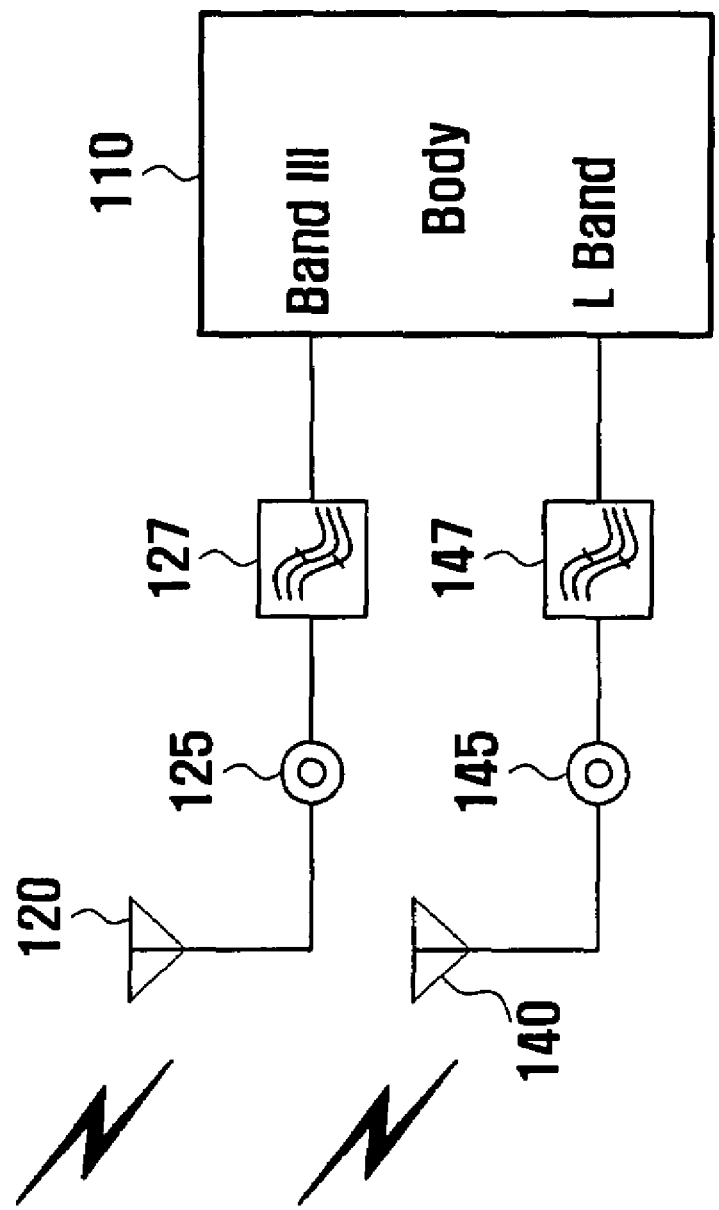
FIG. 1 is a block diagram illustrating a configuration of a conventional dual band DMB receiver for receiving Radio Frequency (RF) signals on band III and L band.
Figure 2:
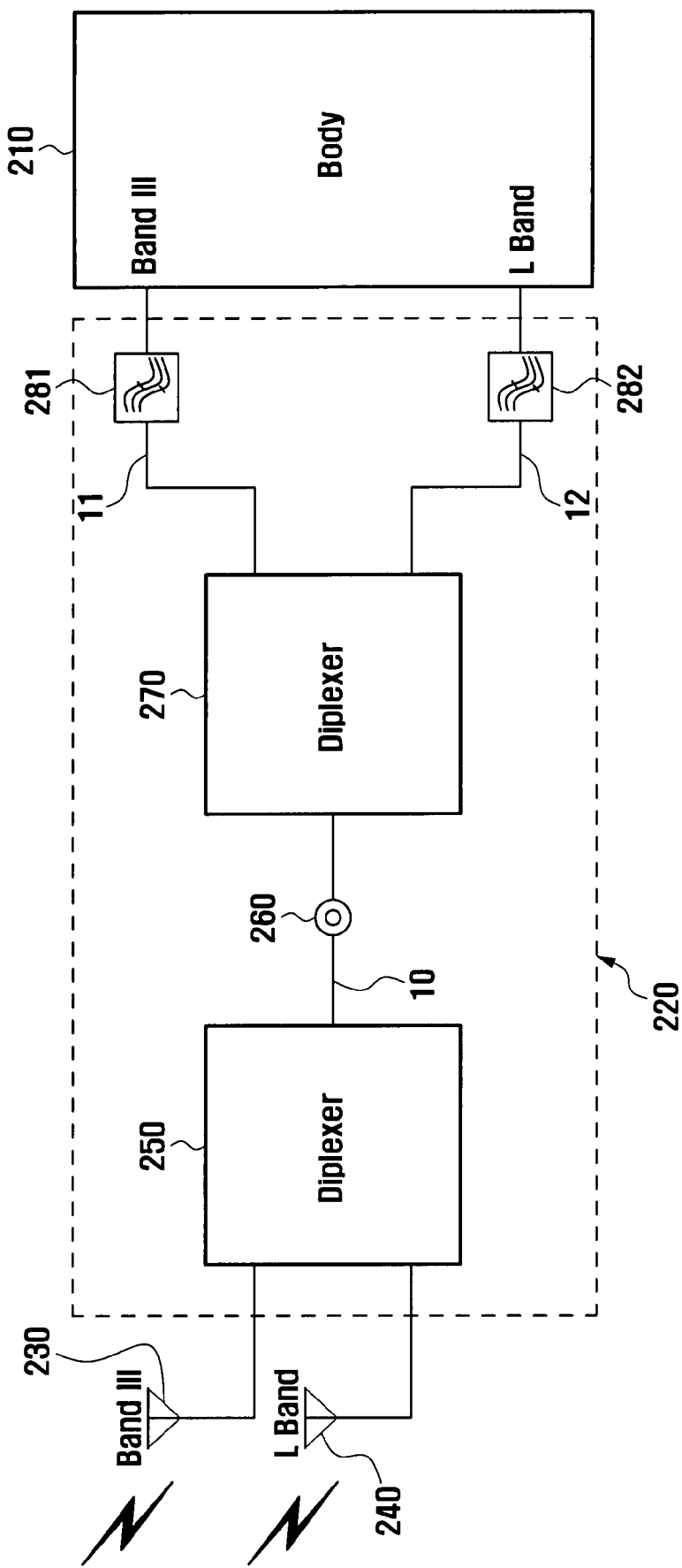
FIG. 2 is a block diagram illustrating a configuration of a DMB receiver according to the present invention.

Referring to FIG. 2, the DMB receiver includes a body 210 and a radio frequency (RF) processing unit 220 connected to the body 210.

RF processing unit 220 includes a band III antenna 230 for receiving signals on the very high frequency (VHF) band III, an L band antenna 240 for receiving signals on the ultra high frequency (UHF) L band, a first diplexer 250 connected to the band III antenna 230 and the L band antenna 240, a second diplexer 270 connected to the body 210 through first and second signal lines 11 and 12, an RF switch 260 interposed between the first and second diplexers 250 and 270, a first band pass filter 281 interposed between the body 210 and the second diplexer 270 on the first signal line 11, and a second band pass filter 282 interposed between body 210 and second diplexer 270 on the second signal line 12.

First and second diplexers 250 and 270 can each be implemented with a combination of a low pass filter and a high pass filter for selectively receiving the band III and L band signals.

Figure 3:
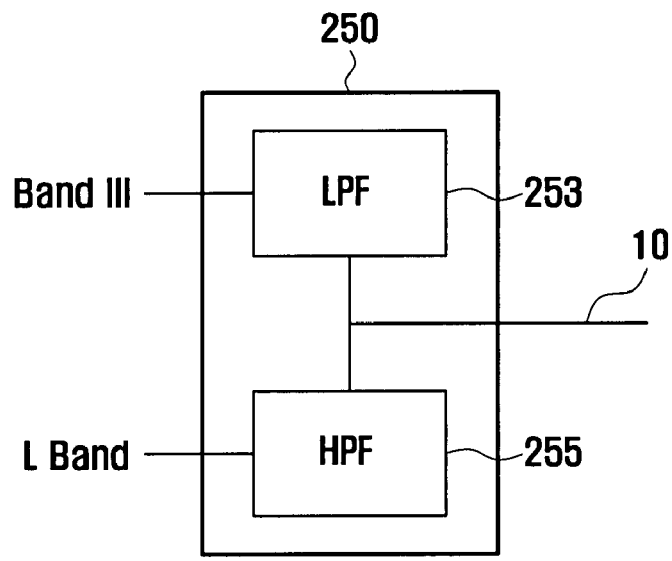
FIG. 3 is a block diagram illustrating a configuration of a first diplexer of FIG. 2.

FIG. 3 is a block diagram illustrating a configuration of first diplexer 250 of FIG. 2. As shown in FIG. 3, first diplexer 250 includes a first low pass filter 253 for passing the band III frequency and a first high pass filter 255 for passing the L band frequency.

Figure 4:
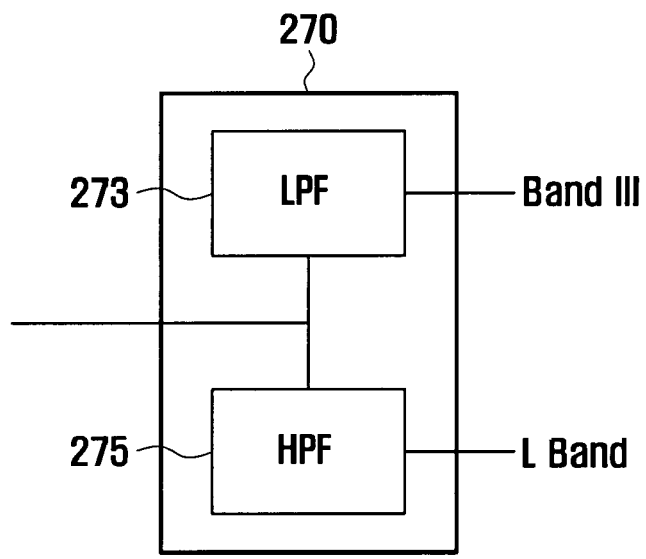
FIG. 4 is a block diagram illustrating a configuration of a second diplexer of FIG. 2.

FIG. 4 is a block diagram illustrating a configuration of second diplexer 270 of FIG. 2. As shown in FIG. 4, second diplexer 270 includes a second low pass filter 273 for passing the band III frequency and a second high pass filter 275 for passing the L band frequency.

The RF signal received by band III antenna 230 is sequentially transferred to body 210 through first low pass filter 253 of first diplexer 250, the second low pass filter 273 of second diplexer 270, and first band bass filter 281 in cooperation with RF switch 260.

The RF signal received by L band antenna 240 is sequentially transferred to body 210 through first high pass filter 255 of first diplexer 250, the second high pass filter 275 of second diplexer 270, and second band pass filter 282 in cooperation with RF switch 260.

The RF signals received by band III antenna 230 and L band antenna 240 are output to RF switch 260 through a signal output line 10, whereby switch 260 measures the propagation characteristics of the signals from band III antenna 230 and L band antenna 240. RF switch 260 forwards the band III signal to body 210 through first band path filter 281 and forwards the L band signal to the body through second band path filter 282. The signals having passed first and second band path filters 281 and 282, are processed by body 210. Body 210 can perform demodulation and decoding on the DMB signals. Since the signal processing operation in body 210 of the DMB receiver is outside the scope of the present invention, detailed description of structure and operation of body 210 is omitted.

As described above, the dual band DMB receiver of the present invention outputs RF signals received by two different band antennae into a single switch using a diplexer, whereby it is possible to measure a conduction characteristic of the signals using the signal switch.

Also, since the dual band DMB receiver of the present invention is implemented with a single RF switch for measuring at least two frequency band signals, it is possible to reduce the manufacturing costs of the DMB receiver and secure space for other components.

Although exemplary embodiments of the present invention have been described in detail herein above, it should be clearly understood by those skilled in the present art that many variations and modifications of the basic inventive concepts herein taught fall within the spirit and scope of the present invention, as further defined by the appended claims.

What is claimed is:

1. A broadcast receiver comprising:
   a first antenna and a second antenna for receiving first and second frequency band signals, respectively;
   a body for recovering the signals received by the first and second antennas; and
   a switch unit for selectively coupling the first and second antennae to the body, wherein the switch unit comprises:
   a first diplexer having two first input terminals connected to the respective first and second antenna and a first output terminal;
   a second diplexer having a second input terminal connected to the first output terminal of the first diplexer and two second output terminals connected to the body; and
   a radio frequency switch interconnecting the first output terminal of the first diplexer and the second input terminal of the second diplexer.

2. The broadcast receiver of claim 1, wherein the switch unit further comprises a first band pass filter installed on a line connecting one of the second output terminals of the second diplexer and the body for passing the first frequency band signal.

3. The broadcast receiver of claim 2, wherein the switch unit further comprises a second band pass filter installed on another line connecting the other of the second output terminals of the second diplexer and the body for passing the second frequency band signal.

4. The broadcast receiver of claim 1, wherein the first diplexer comprises:
   a low pass filter for passing the first frequency band signal; and
   a high pass filter for passing the second frequency band signal.

5. The broadcast receiver of claim 4, wherein the second diplexer further comprises:
   a low pass filter for passing the first frequency band signal; and
   a high pass filter for passing the second frequency band signal.

6. The broadcast receiver of claim 1, wherein the first frequency band signal is a very high frequency (VHF) band III signal.

7. The broadcast receiver of claim 1, wherein the second frequency band signal is an ultra high frequency (UHF) L band signal.

* * * * *